(12) United States Patent
Below et al.

(10) Patent No.: US 7,416,586 B1
(45) Date of Patent: Aug. 26, 2008

(54) FILTER APPARATUS FOR EXTRACTING WATER VAPORS FROM A GAS

(75) Inventors: John Below, Oakland, CA (US); Josh Trainor, Napa, CA (US)

(73) Assignee: RIX Industries, Benicia, CA (US)

( * ) Notice: Subject to any disclaimer, the term of this patent is extended or adjusted under 35 U.S.C. 154(b) by 413 days.

(21) Appl. No.: 11/252,658

(22) Filed: Oct. 18, 2005

(51) Int. Cl.
  *B01D 53/02* (2006.01)
  *B01D 53/26* (2006.01)

(52) U.S. Cl. .................. 96/137; 96/149; 55/DIG. 17

(58) Field of Classification Search .................. 96/134, 96/137, 138, 149, 151; 55/DIG. 17; 210/282, 210/350
See application file for complete search history.

(56) References Cited

U.S. PATENT DOCUMENTS

| | | | | |
|---|---|---|---|---|
| 515,769 A | * | 3/1894 | Harris | 210/352 |
| 3,064,819 A | * | 11/1962 | Jones | 210/266 |
| 3,572,008 A | * | 3/1971 | Hankison et al. | 95/105 |
| 4,673,420 A | * | 6/1987 | Haker et al. | 96/118 |
| 4,816,047 A | * | 3/1989 | Neal | 96/137 |
| 5,622,544 A | * | 4/1997 | Shamine et al. | 96/134 |
| 5,779,772 A | * | 7/1998 | Unger et al. | 96/137 |
| 5,792,245 A | * | 8/1998 | Unger et al. | 96/137 |
| 6,106,596 A | * | 8/2000 | Haramoto et al. | 96/135 |
| 6,309,450 B1 | * | 10/2001 | Millen et al. | 96/131 |
| 6,484,413 B1 | * | 11/2002 | Larsson | 34/80 |
| 6,951,581 B2 | * | 10/2005 | Fornof et al. | 95/122 |
| 2004/0094036 A1 | * | 5/2004 | Nichols et al. | 95/148 |

* cited by examiner

*Primary Examiner*—Frank M Lawrence
(74) *Attorney, Agent, or Firm*—Thomas R. Lampe

(57) ABSTRACT

Filter apparatus for extracting water vapors from a gas includes a housing and a cartridge containing desiccant disposed in the housing. A spring biased follower in the cartridge exerts continuous compressive forces on the desiccant.

9 Claims, 3 Drawing Sheets

FILTER APPARATUS FOR EXTRACTING WATER VAPORS FROM A GAS

TECHNICAL FIELD

This invention relates to a filter for extracting water vapors from a gas and more particularly to a filter utilizing a cartridge holding desiccant employed to dry the gas.

BACKGROUND OF THE INVENTION

Filters for extracting water vapors from a gas, a process known as drying, are very common and in widespread use at the present time. A common material employed is molecular sieve, a bead-like material made from diatomaceous earth with a very high surface area to volume ratio and an affinity for adsorbing water molecules.

Several design considerations apply to the construction of a successful desiccant filter assembly. The desiccant material must be closely packed in its container so that further settlement does not produce channeling or create voids where the gas can bypass close contact with the desiccant.

If the desiccant is exposed to vibrations in service it must be tightly packed to prevent the desiccant beads from rubbing against each other and against the walls of the container which can cause the material to breakdown and form dust.

If the desiccant is contained in a renewable cartridge the cartridge must be mounted in such a manner that it will not vibrate loosely in the housing for the cartridge. Also, the arrangement must be such that the wet inlet gas is prevented from mixing with and contaminating the dry discharge gas.

The gas flow must be directed from one end of the bed to the other and evenly distributed for effective use of all the desiccant material. The desiccant must be protected from direct contact with liquid water as that may cause it to disintegrate.

DISCLOSURE OF INVENTION

The apparatus disclosed and claimed herein incorporates structural features which cooperate to ensure that all of the above design conditions are satisfied. The apparatus is characterized by its reliability and high degree of effectiveness during operation.

The filter apparatus of the present invention is for extracting water vapors from a gas. The filter apparatus includes a housing defining a housing interior.

A cartridge containing desiccant is disposed in the housing interior between spaced cartridge ends, the cartridge for receiving the gas and directing flow of the gas through the desiccant.

A follower is disposed in the cartridge, engaging the desiccant. Biasing means is employed to bias the follower toward the desiccant to exert compressive forces on the desiccant.

Other features, advantages and objects of the present invention will become apparent with reference to the following description and accompanying drawings.

BEST MODE FOR CARRYING OUT THE INVENTION

Figures 1, 2:
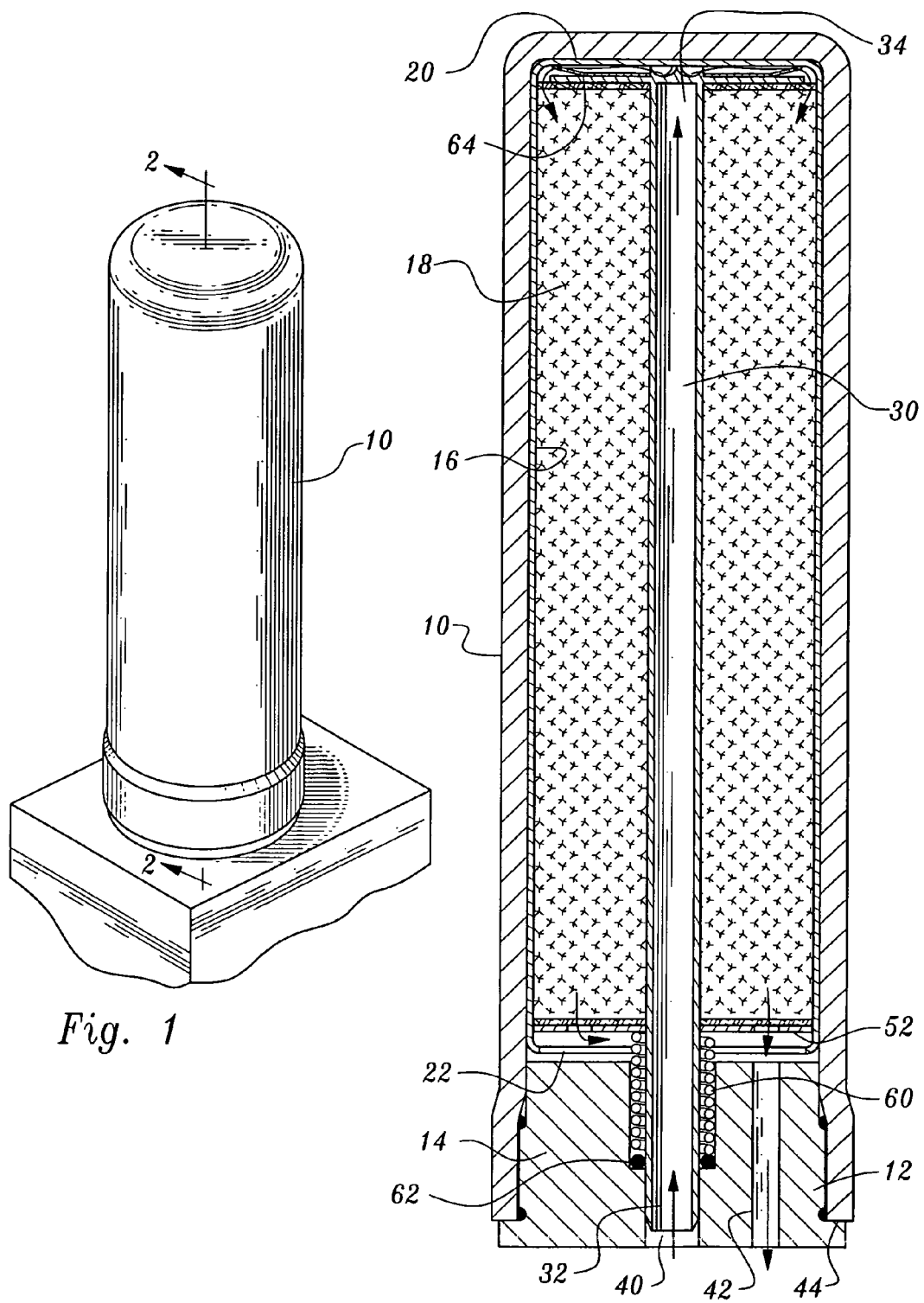
FIG. 1 is a perspective view of filter apparatus constructed in accordance with the teachings of the present invention.
FIG. 2 is an enlarged, cross-sectional view taken along the line 2-2 in FIG. 1 and showing the cartridge essentially completely filled with desiccant.
Figure 3:
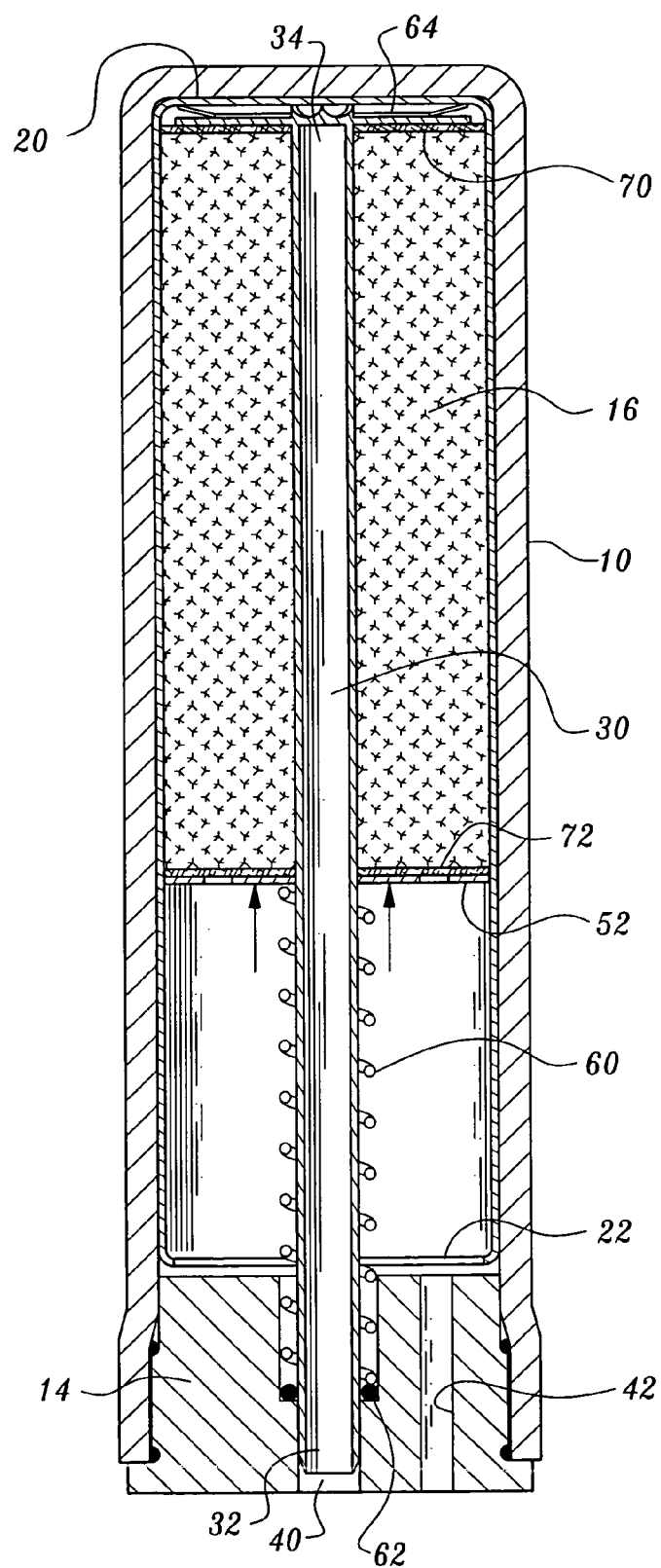
FIG. 3 is a view similar to FIG. 2, but illustrating some of the desiccant depleted and occupying only a portion of the cartridge interior, a biased retention plate continuing to exert compressive forces on the desiccant.
Figures 4, 5:
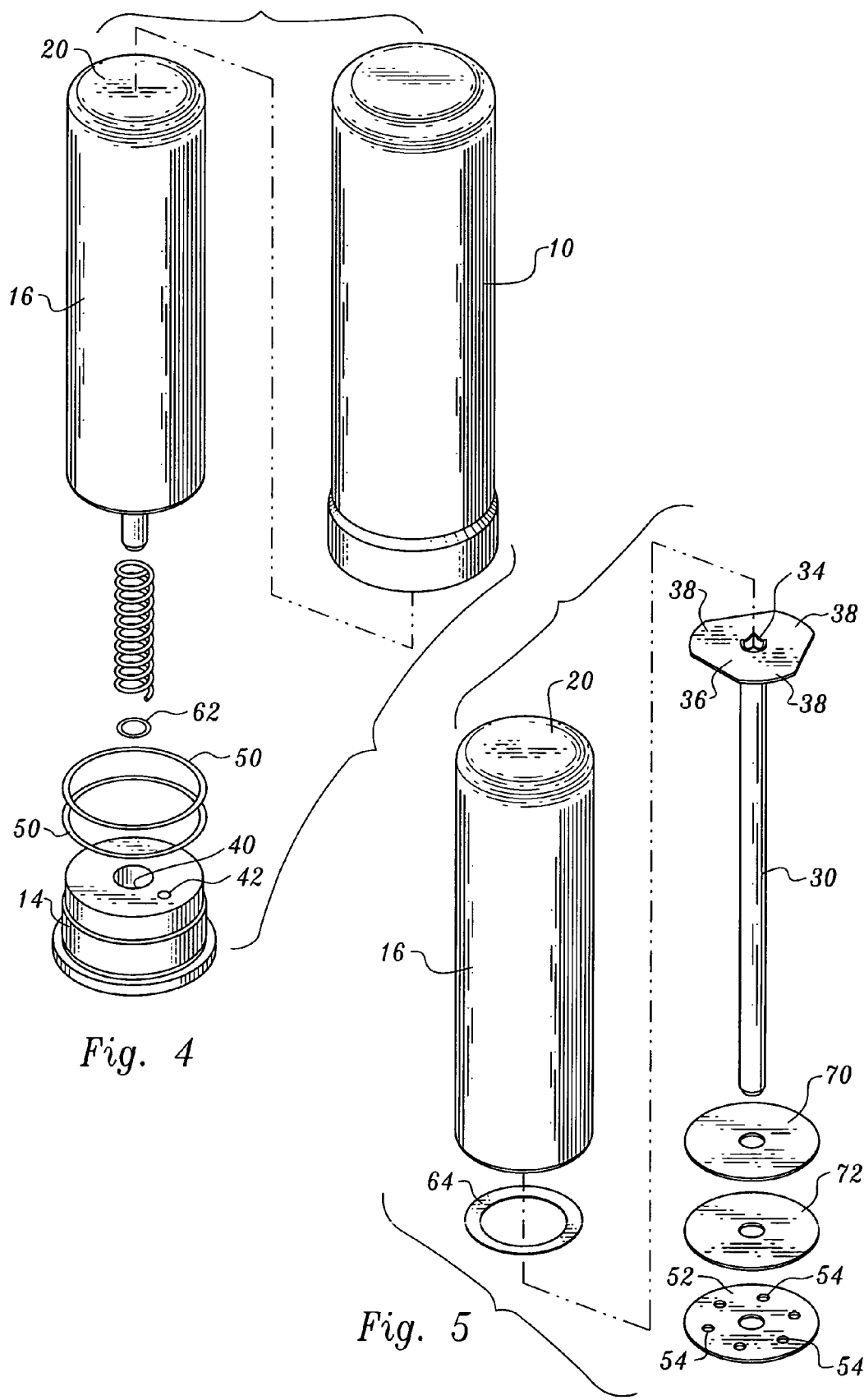
FIG. 4 is an exploded, perspective view illustrating selected structural elements of a housing and cartridge assembly of the filter apparatus.
FIG. 5 is an exploded, perspective view illustrating certain structural elements of the cartridge assembly.

Referring now to the drawings, filter apparatus constructed in accordance with the teachings of the present invention includes a housing having a cylindrically-shaped pressure vessel 10 having an interior and an open end 12 communicating with the interior. A closure or cap 14 is releasably secured to the pressure vessel in any known manner at the open end 12.

A cartridge assembly including a cartridge 16 having spaced cartridge ends 20, 22 and including desiccant 18 is between the spaced cartridge ends 20, 22 is disposed in the housing interior. Cartridge end 20 is closed and cartridge end 22 is open.

Gas flow path defining structure is employed to deliver vaporized gas under pressure from the outer or open cartridge end 22 to closed or inner cartridge end 20 without engaging the desiccant 18. The gas under pressure subsequently flows from the closed end to the open end through the entire length of desiccant and in engagement therewith to remove water vapors from the gas. More particularly, the gas flow path defining structure includes an elongated hollow tube 30 having a gas inlet 32 and a gas outlet 34.

Attached to the tube and radiating outwardly therefrom closely adjacent to the gas outlet is a spacer 36 which includes three outer lobes 38, the spacer radiating outwardly to a lesser degree between the lobes. The lobes 38 engage the inner surface of the cartridge wall but gas exiting the tube gas outlet 32 (as shown in FIG. 2) flows outwardly between the spacer and the closed end of the pressure vessel 10 and then downwardly between the lobes into and through the desiccant. Holes or slots could be formed in the spacer to provide this function also.

Closure 14 defines a gas inlet port 40 communicating with the interior of tube 30, the gas inlet port receiving gas to be treated from a source (not shown) thereof. The closure 14 also defines a gas outlet port 42 from which exits the gas dried by virtue of its passage through the desiccant. These flow paths are shown by arrows in FIG. 2.

It should also be noted that the gas inlet port holds the lower end of the hollow tube and cooperates with the spacer 36 to maintain the tube centered in the desiccant and coaxial with the cartridge. The closure 14 is precisely placed relative to the pressure vessel 10 by engagement between the outer peripheral wall of the closure and the inner peripheral wall at the open end of the pressure vessel as well as engagement between the pressure vessel open end and a seating flange 44 formed on the closure. In the arrangement illustrated O-rings 50 help to maintain a fluid-tight interconnection between the pressure vessel and the closure.

A follower is located in the cartridge to exert compressive forces thereon to attain the objectives outlined above. More particularly, the follower comprises a retention plate 52 slidably mounted on tube 30 for slidable movement within the cartridge. Retention plate 52 defines a plurality of openings 54 allowing passage of gases through the retention plate after water vapors have been removed therefrom by the desiccant and prior to passage of the dried gas through gas outlet port 42.

A coil compression spring 60 is disposed about the tube and continuously urges the retention plate 52 in an upward direction as viewed in the drawing figures. The desiccant is thus always maintained in the desired compressed condition even though the desiccant does not completely fill the cartridge. The lower end of the spring 60 bears against the closure 14 at all times. A seal 62 is located at the lower end of the spring 10 in a recess of the closure 14.

The filter apparatus illustrated also includes an internal compression spring 64 disposed between the spacer 36 and the closed end of the pressure vessel. Spring 64 always exerts a downward pressure on the closed cartridge end 20 to prevent freedom of movement between the housing and the cartridge. The coil compression spring 60 biasing the retention plate in an upward direction also serves the function of holding the cartridge against movement inside the pressure vessel.

It is desirable to employ an inner filter element 70 between the spacer 36 and the desiccant through which the pressurized gas passes after exiting the gas outlet 34 and prior to flow thereof through the desiccant. An outer filter element 72 is located between the desiccant and retention plate 52. The inner and outer filter elements 70, 72 may suitably be, for example, a fibrous filter matrix similar to felt or compressed cellulose or sintered plastic media.

The invention claimed is:

1. Filter apparatus for extracting water vapors from a gas, said filter apparatus comprising, in combination:
    a housing defining a housing interior;
    a cartridge having two, spaced cartridge ends containing a desiccant between said cartridge ends disposed in said housing interior, said cartridge for receiving the gas and directing flow of the gas through the desiccant, one of said cartridge ends being an open end and the other of said cartridge ends being a closed end;
    a follower in said cartridge operatively engaging said desiccant;
    biasing means for biasing said follower toward said desiccant to exert compressive forces on said desiccant; and
    gas flow path defining structure extending through said desiccant for delivering the gas under pressure from said open end toward said closed end without engaging said desiccant, and said gas under pressure subsequently flowing from said closed end to said open end through said desiccant in engagement therewith to remove water vapor therefrom, said gas flow path defining structure comprising a hollow elongated member having a gas inlet and a gas outlet and a spacer located at or closely adjacent to said gas outlet and engageable with said cartridge to maintain said gas outlet positioned at a predetermined location spaced from the closed end, the gas exiting said gas outlet flowing between said spacer and the closed end before flowing from said closed end said open end through said desiccant in engagement therewith.

2. The filter apparatus according to claim 1 additionally comprising an internal compression spring disposed between said spacer and said closed end.

3. The filter apparatus according to claim 1 additionally comprising an inner filter element disposed between said spacer and said desiccant through which the gas passes after exiting the gas outlet and prior to flow thereof through said desiccant in engagement therewith.

4. The filter apparatus according to claim 1 wherein said follower comprises a retention plate slidably mounted on said hollow elongated member for slidable movement within said cartridge, said retention plate defining one or more retention plate openings allowing for the passage of the gas therethrough after water vapors have been removed therefrom by said desiccant.

5. The filter apparatus according to claim 2 wherein said internal compression spring is disposed about said hollow elongated member.

6. The filter apparatus according to claim 4 additionally comprising an outer filter element disposed between said retention plate and said desiccant.

7. The filter apparatus according to claim 1 wherein the hollow elongated member is a hollow tube, the hollow tube and the cartridge being coaxial.

8. The filter apparatus according to claim 4 wherein said housing defines a gas inlet port in fluid flow communication with the gas inlet of the hollow elongated member and a gas outlet port in communication with the one or more openings of said retention plate.

9. The filter apparatus according to claim 8 wherein said housing includes a pressure vessel having an open end and a closure releasably connected to said pressure vessel at said open end, said gas inlet port and said gas outlet port being spaced from one another and defined by said closure.

\* \* \* \* \*